United States Patent

[11] 3,570,633

[72] Inventor Edward V. Garnett
Lakewood, Colo.
[21] Appl. No. 774,330
[22] Filed Nov. 8, 1968
[45] Patented Mar. 16, 1971
[73] Assignee Servis Truck Body, Division of Republic Corporation
Paramount, Calif.

[54] HYDRAULIC BRAKE ACTUATOR FOR TRAILERS
7 Claims, 5 Drawing Figs.
[52] U.S. Cl. .................................................. 188/112, 280/428
[51] Int. Cl. ............................................. B60t 7/20
[50] Field of Search............................................ 188/3, 142, 112; 303/7, 18, 49; 280/422, 427, 428

[56] References Cited
UNITED STATES PATENTS

| | | | |
|---|---|---|---|
| 3,460,654 | 8/1969 | White et al. ................. | 188/112X |
| 2,229,499 | 1/1941 | Fisette....................... | 188/112 |
| 3,007,552 | 11/1961 | Eksergian.................... | 188/112 |
| 3,065,830 | 11/1962 | Krotz......................... | 188/112 |
| 3,180,454 | 4/1965 | De Angelis et al............. | 188/112 |
| 3,323,619 | 6/1967 | Lacy.......................... | 188/112 |

*Primary Examiner*—George E. A. Halvosa
*Attorney*—Van Valkenburgh and Lowe

ABSTRACT: The hydraulic brake actuator for trailers is mounted on the trailer frame and is associated with the towing hitch, through a shaft having a rearwardly facing shoulder which moves a front plate rearwardly to move a plunger against the piston of the master brake cylinder, or pulls forwardly a rear plate, on which the master cylinder is mounted, with a coil spring acting between the front and rear plates. Thus, hydraulic fluid pressure for the trailer brakes will be produced when the towing vehicle is moving either forwardly or backing up and the vehicle brakes are applied. A solenoid control valve in the hydraulic fluid circuit normally prevents application of the trailer brakes, unless the towing vehicle brakes are applied, through connection of the solenoid with the stop light circuit of the towing vehicle. A lever connected by a safety chain to the towing vehicle will move the plunger into the master cylinder, to apply the trailer brakes in the event of the failure of the hitch, through a pressure responsive valve in parallel with the solenoid valve but opening only when a higher pressure than normal of the hydraulic fluid is produced. A relief valve between the master cylinder and a fluid reservoir prevents breakage of the hydraulic lines on the trailer or parts associated therewith.

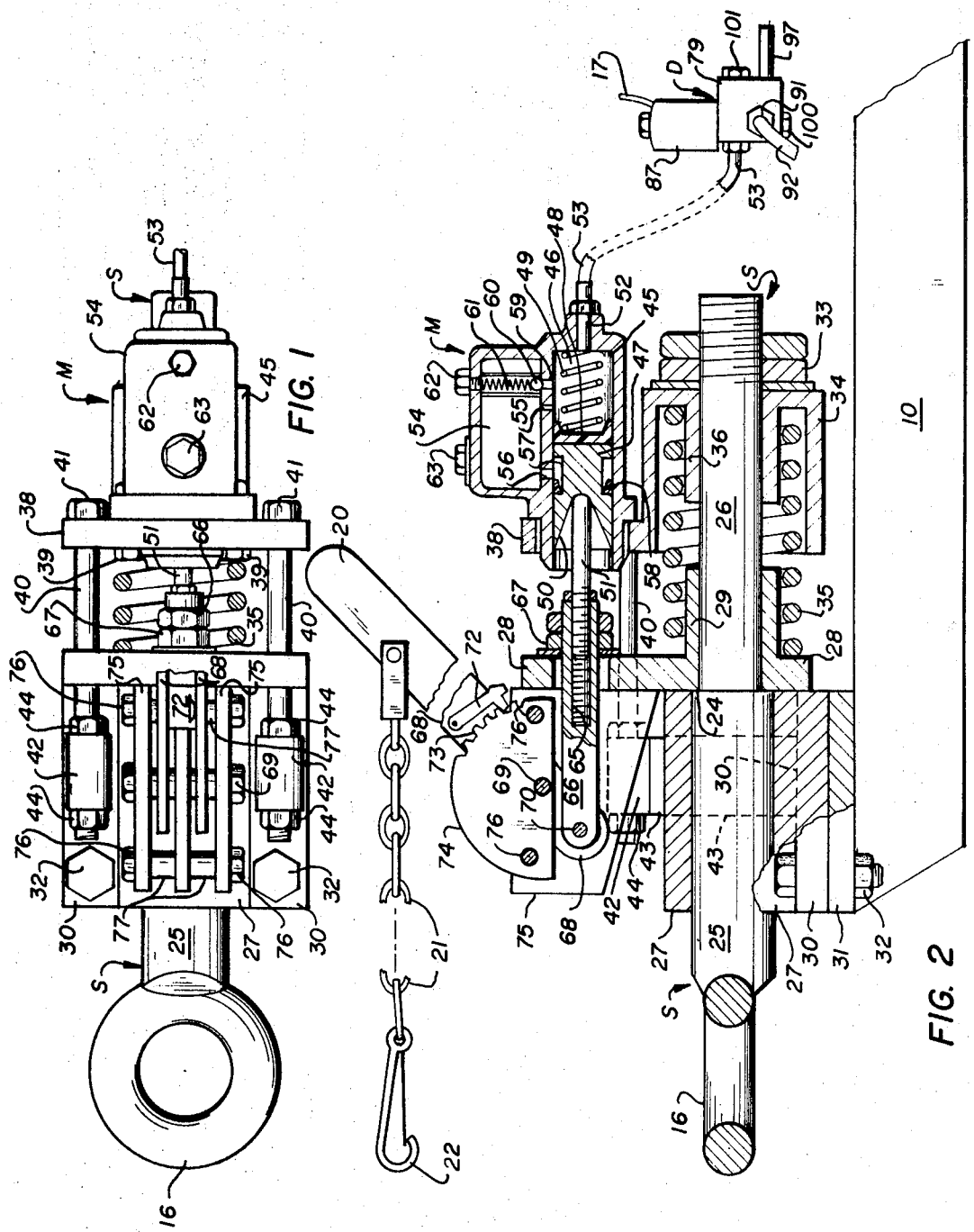

INVENTOR.
Edward V. Garnett
BY
*Van Valkenburgh & Lowe*
ATTORNEYS

HYDRAULIC BRAKE ACTUATOR FOR TRAILERS

This invention relates to hydraulic brake actuators for trailers which are pulled by a truck or similar towing vehicle.

When driving down the highway, it is necessary that the truck or towing vehicle be able to pull the trailer without interference by the trailer brakes during normal acceleration or normal deceleration, but that when the truck brakes are applied, the trailer brakes will also be applied in synchronization with the application of the brakes of the towing vehicle. Such a situation occurs when the truck is braked, because of traffic or similar conditions, or when the truck and trailer are proceeding downhill and the speed of the truck and trailer must be reduced. As will be evident, it is also necessary that the trailer brakes be applied in synchronization with the brakes of the towing vehicle when backing up.

The above is conveniently exemplified by the instance of a utility truck towing a trailer carrying one or more reels of cable. When a truck, weighing perhaps on the order of two to four or five tons, is pulling a cable reel trailer, which may weigh on the order of two to five tons, but which may carry a load of cable reels weighing on the order of five to ten tons, it is necessary that the trailer brakes be set at the desired times, in order to control the trailer and its load without undue surges. Since the brakes of a truck are usually designed for the weight of the truck and its normal load, the weight of the trailer and its load requires an auxiliary braking system, as on the trailer, which necessitates a braking capacity considerably in excess of that of the truck.

In certain instances, particularly when the truck and trailer are moved off the highway, as for unloading the cable carried by the reel or reels mounted on the reel trailer, the effect of an incline, particularly a steep incline, must be overcome. Such a condition may occur when the truck and trailer are driven up an incline and then stopped. The disproportion in weight of the truck and its load, on the one hand, and the trailer and its load, on the other hand, causes the trailer and its load to draw the truck backwards downhill. A somewhat similar situation occurs when the truck is used to move the trailer down an incline, where a stop must be made on the incline, with the result that the weight of the trailer and its load tends to push the truck downhill, when the truck is stopped. Such pushing downhill or dragging downhill may cause considerable inconvenience in stopping the trailer at the desired position.

It is inconvenient to connect the trailer brakes with the hydraulic lines actuating the truck brakes, since any breakage in the connection may cause all brakes to be lost. Also, an undue amount of time is consumed in connecting and disconnecting hydraulic connections between the trailer and the truck. However, the truck braking mechanism is ordinarily provided with an electrical switch, for turning on a stop indicating light, and the mechanism for actuating the trailer brakes may be advantageously interconnected with the stop light circuit of the truck. Such an electrical connection may be engaged or disengaged with ease, whenever the trailer is connected to or disconnected from the truck. However, there are certain safety functions, in addition to such connection, which must be accomplished by the trailer brake mechanism. One safety necessity is that of quickly and positively applying the trailer brakes, in the event that the hitch between the truck and trailer disconnects or a part thereof breaks. Since such breakage or disconnection will ordinarily occur while the trailer is being towed by the truck, a safety chain connection may be utilized to pull a safety lever to an "on" position, and thereby apply the trailer brakes quickly.

In general, an hydraulic brake actuator for trailers, constructed in accordance with this invention, is associated with the tow bar of the trailer. A forward movement of the trailer toward the truck or towing vehicle, or a rearward movement of the trailer away from the truck or towing vehicle, will produce hydraulic pressure in a master cylinder which is proportional to the movement and thus is adapted to apply the trailer brakes to a degree corresponding to the application of the brakes of the truck or towing vehicle. However, the hydraulic pressure from the master cylinder will normally not be transmitted to the trailer brakes unless a solenoid control valve, which is energized whenever the warning stop light electrical circuit of the truck or towing vehicle is energized, is open, in order to synchronize the application of the trailer brakes with the application of the brakes of the towing vehicle. Thus, normal movement of the trailer away from the truck or towing vehicle, during acceleration during driving, or normal movement of the trailer toward the truck or towing vehicle, during deceleration during driving, will not cause the trailer brakes to be applied. In an emergency situation, in the event that the solenoid control valve, normally energized through the stop light electrical circuit of the truck, is not energized, the trailer brakes will be applied if the trailer moves more than a predetermined distance toward or away from the truck or towing vehicle, through a pressure relief valve in parallel with the solenoid control valve. An emergency lever connected to the trailer or towing vehicle by a chain will also operate the master cylinder to cause the trailer brakes to be set, in the event that the tow bar or similar connection between the truck and trailer becomes disconnected or breaks and, through a ratchet mechanism, will cause the trailer brakes to remain set until the condition is corrected. This lever may also be used as a hand lever for operation of the trailer brakes.

Among the objects of the present invention are to provide a novel hydraulic brake actuator for trailers; to provide such a brake actuator through which the trailer brakes may be independent of but produce a braking effect equal to or greater than the brakes of the towing vehicle; to provide such a brake actuator which will cause the trailer brakes to be applied automatically in synchronization with the braking action of the towing vehicle, both forward and reverse; to provide such an hydraulic brake actuator which does not rely on an external or auxiliary supply of air, vacuum or electricity to produce hydraulic pressure to apply the brakes; to provide such an hydraulic brake actuator which produces a braking effect which is in substantial proportion to the deceleration of the towing vehicle; to provide such an hydraulic brake actuator which is equipped with means for providing a positive, automatic emergency brake action; to provide such an hydraulic brake actuator which is self-contained; to provide such an hydraulic brake actuator which renders the trailer brakes inactive during normal acceleration and deceleration of the towing vehicle; to provide such an hydraulic brake actuator which causes the trailer brakes normally to be applied only when the brakes are applied on the towing vehicle but will respond to an emergency situation and then cause the trailer brakes to be applied; and to provide such an hydraulic brake actuator which is relatively simple in construction and particularly effective in use.

The foregoing and additional objects of this invention will become apparent from the description which follows, taken in conjunction with the accompanying drawings, in which:

FIG. 1 is a top plan view of an hydraulic brake actuator constructed in accordance with this invention;

FIG. 2 is a vertical section, taken along line 2—2 of FIG. 1, showing also an hydraulic control device omitted from FIG. 1 for clarity of illustration;

Figure 3:
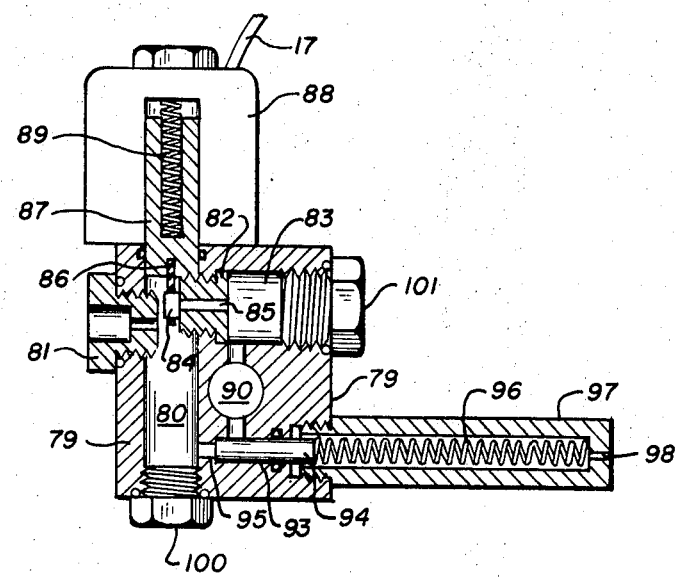
FIG. 3 is a transverse section, on an enlarged scale, of the hydraulic control device, i.e., a combined solenoid control valve and relief valve unit, shown in FIG. 2.
Figure 5:
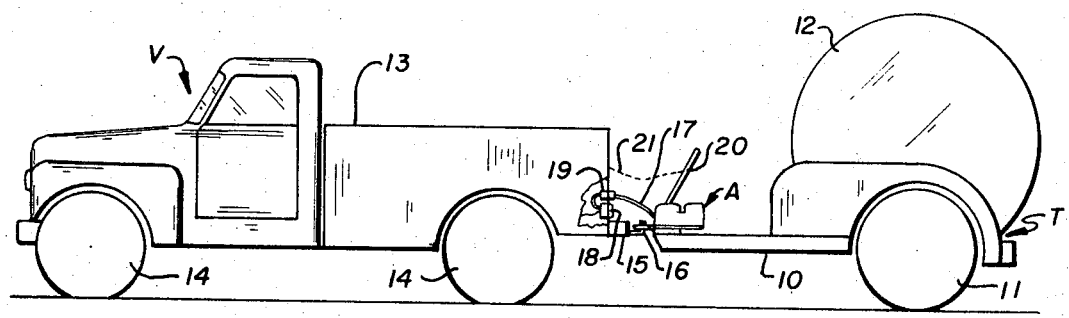
FIG. 5 is a side elevation, on a reduced scale, of a truck or towing vehicle connected to a trailer having the hydraulic brake actuator of FIG. 1 installed thereon.

As illustrated in FIG. 5, an hydraulic brake actuator A of this invention may be mounted on the front of converging beams 10 of the frame of a trailer T, such as having wheels 11 and adapted to carry a cable reel 12 to a point of use. A towing vehicle V is illustrated as a truck having a body 13 and wheels 14, with a towing hitch 15 being installed at the rear of the body 13, such as including a conventional pin engaging an eye 16, shown also in FIGS. 1 and 2, for towing the trailer. An hydraulic control device D, shown in FIGS. 2 and 3, is mounted at any appropriate position on the trailer T and is connected by a two-wire electrical cable 17 with the electrical circuit for a stop light 18 of the towing vehicle V. The stop light circuit of the towing vehicle V, as shown, is extended to a plug 19, preferably providing a watertight connection and mounted at the rear of body 13 for easy connection to and disconnection from electrical cable 17. The wheels 11 of trailer T and wheels 14 of towing vehicle V are provided with hydraulic brakes of any suitable conventional construction and therefore these brakes are not shown.

The hydraulic brake actuator A is also provided with an emergency lever 20 connected to the vehicle V by a normally slack chain 21 having, as in FIG. 2, a snap 22 at the opposite end, for attachment to the vehicle V. As will be evident, in the event that the towing pin becomes disconnected from the towing eye 16, or either of these parts or any part associated therewith should break during use, the trailer T will normally fall behind the towing vehicle V and the safety chain 21 will pull the lever 20 to an upright position in which the brakes of the trailer T will be applied, in a manner hereinafter described.

As in FIGS. 1 and 2, the towing eye 16 may be attached, as by welding, to the front end of a shaft S which has a shoulder 24, for a purpose described below, between a larger diameter portion 25 and a smaller diameter portion 26. Shaft S may be chrome plated or otherwise treated so that it will not require lubrication for movement of larger shaft portion 25 in a bearing 27 or movement of smaller shaft portion 26 in a bearing formed by a hole in a front plate 28 and a sleeve 29 which is aligned with the hole and attached to front plate 28 or integral therewith, as shown. When shaft S is chrome plated, the bearings therefor may be formed of mild steel. Bearing 27 may be provided with integral or attached flanges 30 which rest on a mounting plate 31 secured to beams 10 by welding or the like, with bolts 32 being utilized to attach the brake actuator A to the trailer frame. The opposite end of shaft S may be threaded, as shown, to receive a nut 33, with which a washer and lock nut are associated, as shown, for transmitting forward movement of shaft S to a cup 34 which encircles a coil spring 35 and is provided on the inside with a guide 36 for the adjacent end of coil spring 35, which guide also encircles shaft S. The opposite end of spring 35 abuts front plate 28, with sleeve 29 also serving as a guide for the corresponding end of spring 36.

The hydraulic actuator A also includes a master cylinder M, which may be conventional in construction, except for a variation hereinafter indicated and which is mounted on a rear plate 38, upstanding from and attached to or integral with cup 34, the master cylinder M being attached to plate 38 in any suitable manner, as by capscrews 39. Thus, the master cylinder M is movable with the cup 34 and is guided by rods 40 which extend through suitable holes in plate 38, with heads 41 of the rods acting as stops to limit movement of master cylinder M in a rearward direction. The guide rods 40 may be anchored in position to flanges 30, each by insertion into a collar 42 attached, as by welding, or formed integrally with an upstanding bracket 43 and locked in position by nuts 44.

The master cylinder M comprises a conventional housing 45 having an interior cylinder 46, for movement of a piston 47, against the inner end of which abuts a flanged cup 48 formed of neoprene or other suitable material. Cup 48 is held in engagement with the inner end of piston 47 by a light coil spring 49, while the outer end of piston 47 is provided with a tapering socket 50 engaged by a plunger 51. When the master cylinder M is moved forwardly, i.e., to the left in FIG. 2, by a forward pull on shaft S, as when the trailer moves further rearwardly from the towing vehicle or when the trailer and vehicle are being backed and the trailer brakes are applied, the plunger 51 will move the piston 47 rearwardly in the cylinder 46, to force hydraulic fluid through an outlet 52 into a flexible hose 53 to hydraulic device D, for application of the trailer brakes when the brakes of the towing vehicle have been applied, in a manner hereinafter described. Similarly, if the trailer and its frame, including beams 10, moves forwardly toward the towing vehicle, as when the towing vehicle is decelerated or stopped, shoulder 24 on shaft S will move front plate 28 rearwardly and thereby cause plunger 51 to move piston 47 rearwardly and again force hydraulic fluid through outlet 52 into hose 53 to hydraulic device D. This will again cause the trailer brakes to be applied, in the manner described below, in the event that the brakes of the towing vehicle have been applied.

The master cylinder M further includes a reservoir 54 for hydraulic fluid, conveniently disposed above the cylinder 46, with three holes communicating between reservoir 54 and the space 46, including a small bleed hole 55, which permits any air in the hydraulic fluid of the trailer brake lines to bleed upwardly into the reservoir 54, as well as relieving any pressure remaining in the hydraulic lines, after piston 47 returns to the position of FIG. 2. It will be noted that, as piston 47 moves rearwardly, the peripheral flanges of cup 48 will close off bleed hole 55, so as not to interfere with the production of sufficient pressure of hydraulic fluid to apply the trailer brakes in an effective manner. Another hole 56 places the reservoir 54 in communication with a space provided by a recess 57 extending peripherally around the piston 47, to insure a supply of hydraulic fluid to the cylinder 46. A sealing cup 58, similar to cup 48, but having a central hole which surrounds the central portion of piston 47, prevents leakage of hydraulic fluid from the master cylinder. The third hole 59 is a pressure relief hole disposed rearwardly of piston 47 and normally closed by a ball 60 pressed downwardly by a spring 61, which is disposed within the tubular lower end of a bolt 62 having a threaded upper end, as shown, for mounting in the master cylinder. The pressure relief hole 59 and ball valve 60, together with associated parts, comprise the only modification necessary to a conventional master cylinder, which is completed by a filling plug 63 for the hydraulic fluid reservoir 54. The ball valve 60 is adjusted through the selection of an appropriate spring 61, so that during the normal application of the trailer brakes, the ball will remain seated. However, if an undue pressure should develop, which would tend to break any of the hydraulic lines or parts associated therewith, the ball 60 will be unseated and relieve the pressure to the extent that danger of breakage of lines or parts is avoided, but sufficient pressure will still remain to apply and maintain the trailer brakes.

Plunger 51 is also adapted to move the piston 47 into cylinder 46 and produce hydraulic fluid pressure to apply the trailer brakes and, when necessary, may also be actuated by movement of lever 20 upwardly from the position shown in FIG. 2, either manually or through safety chain 21, in the manner heretofore described. Thus, plunger 51 is directly connected to lever 20 but is also movable by plate 28, being adjustable in position within a socket 65 of a rod 66 which is both interiorly and exteriorly threaded at the socket and adapted to be locked in adjusted position by a locknut, as shown. The exterior threads of rod 66 are engaged by a nut 67, with which a lock nut and a washer are associated, as shown, with the washer interposed between nut 67 and plate 28, to produce a positive movement of plunger 51 when plate 28 is moved rearwardly by shoulder 24 of shaft S. During such movement, of course, the heads 41 of guide rods 40 will restrain rearward movement of the master cylinder M, while the lower coil spring 35 will return the master cylinder M to its original position, when the force moving master cylinder M toward plunger 51 is removed. Lever 20, the lower end of which is bifurcated to provide arms 68, as in FIG. 1, is pivoted on a pin 69 and is also pivotally connected at its lower end by a pin 70 to rod 66.

Lever 20 is provided with a ratchet 72 disposed between the lower arms 68 of the lever and spring pressed in a conventional manner into engagement with teeth 73 of an arcuate rack 74. Rack 74 is mounted centrally between upstanding plates 75, as on bolts 76, with spacing sleeves 77 being placed on the bolts on each side of the rack, as in FIG. 1. The pivot pin 69 for lever 20 may comprise merely a bolt with similar spacing sleeves, as shown, between plates 75 and the lower arms 68 of lever 20, as well as between the arms, as shown. The front edges of plates 75 may be attached, as by welding, to the front plate 28, so that lever 20 and rack 74 will move in unison with the front plate, whenever the front plate is moved rearwardly by shoulder 24 of shaft S. However, as will be evident, lever 20 may be moved upwardly, as to an upright position from that shown in FIG. 2, either by chain 21 in an emergency situation or manually, in order to cause plunger 51 to move piston 47 to produce hydraulic fluid pressure for application of the trailer brakes, with nut 67 moving away from front plate 28 with rod 66.

The hydraulic device D, as in FIGS. 2 and 3, may include a housing 79 having an inlet passage 80 to which hydraulic fluid is supplied through a fitting 81 for hose 53 and into which an apertured plug 82 extends from a transverse passage 83 to form a seat for a valve 84 which normally closes hole 85 in plug 82, but is mounted on a stem 86 in a manner which permits normal pressure in passage 80 to hold valve 84 closed, but permits back flow through valve 84 when the hydraulic pressure in the master cylinder is released. Thus, valve 84 may be a disc disposed in a hole in stem 86, so that the disc may be held against the port formed by hole 85 but may be moved off the port by return flow of hydraulic fluid, with fitting 81 preventing valve disc 84 being forced out of the hole in the stem. Stem 86 is mounted on a movable core 87 of a solenoid 88, with the core extending into passage 80 and a spring 89 urging the valve toward its normally closed position. As will be evident from FIG. 3, when the valve 84 is moved away from hole 85 laterally, by energization of solenoid 88, the hydraulic fluid supplied to inlet passage 80 will flow into passage 83 and into an outlet passage 90, which is transverse to both inlet passage 80 and passage 83, thence through a fitting 91 and a tube 92 of FIG. 2 to the trailer brakes. A second transverse passage 93, parallel to passage 83, connects with inlet passage 80 and is also connected to outlet passage 90 but flow through passage 93 is normally prevented by a valve 94 which is urged to closed position against a seat 95 by a spring 96 extending outwardly from the housing 79 within a tube 97 having a closed outer end provided with a small hole 98, to relieve air pressure produced within tube 97 by movement of valve 93. As will be evident, whenever the pressure of hydraulic fluid within inlet passage 80 is sufficient to move valve 93 outwardly from its seat against the pressure of spring 96, the relief valve will open and hydraulic fluid can flow through outlet passage 90 to the trailer brakes. It will be noted that relief valve 94 should be set at a slightly lower pressure than relief valve ball 60 in the master brake cylinder M, but in excess of the normal pressure produced in applying the brakes. Thus, if for any reason the electrical circuit for the stop light of the towing vehicle should fail, as through a broken wire or loose contact, the trailer brakes will still be applied, but only if the trailer moves either forwardly toward or rearwardly from the towing vehicle an amount greater than the movement which would cause the trailer brakes normally to be applied. Thus, during driving, the relief valve 94 will not be opened, but only in emergency situations as of the type described above. The outer ends of passages 80 and 83 may be closed by threaded plugs 100 and 101, respectively, while O-ring seals may be provided around core 87 and valve 94, as well as for plugs 100 and 101, as shown.

Figure 4:
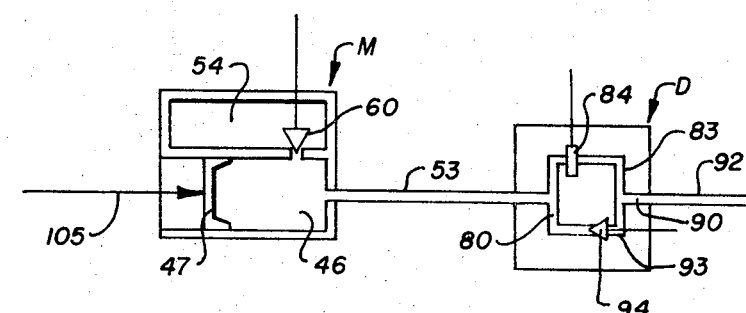
FIG. 4 is a diagram of the hydraulic connections between the master cylinder and the brake cylinders of the trailer.

The operation of the hydraulic portions of the device of this invention may be better understood by reference to FIG. 4. As has been explained previously, the piston 47 of the master brake cylinder M will be moved into the cylinder 46 by plunger 51 of FIGS. 2 and 3, in the direction of arrow 105 of FIG. 4, upon either the master cylinder M being moved toward the plunger 51 by a forward movement of shaft S or by the plunger 51 being moved into the master cylinder by a rearward movement of plate 28, corresponding to a rearward relative movement of shaft S and engagement of shoulder 24 with plate 28, or by direct movement of plunger 51 through lever 20. Upon such movement of the piston 47, hydraulic fluid will be forced through hose 53 into the inlet passage 80 of hydraulic device D. In the event that the brakes of the towing vehicle have been applied, solenoid 88 of FIG. 3 will be energized through electricity transmitted through cable 17 from the stop light circuit of the towing vehicle, whereupon valve 84 will be opened, to permit the hydraulic fluid to flow through passages 83 and 90 of FIG. 3 and through tube 92 to the trailer brakes, which are illustrated diagrammatically in FIG. 4 as including cylinders 106, in which opposed pistons 107 are disposed and supplied by branch tubes 108 and 109, respectively. In conventional brakes, the pistons 107 are normally urged by the pressure of springs, represented by arrows 110, into a position in which the brakes are released. However, upon a supply of hydraulic fluid under pressure through branch tubes 108 and 109, the pistons 107 of the brake cylinders will be forced apart, to cause the brake shoes to expand against the brake drums or the brake linings to be drawn about the brake drums, depending upon the type of brake used. When the brake cylinder piston 47 returns to its initial position, i.e., the brakes are no longer to be applied, the pressure in master cylinder M is relieved, with a consequent return flow of the hydraulic fluid, during which the valve 84 will normally be forced off its seat. In addition, the spring force 110 exerted against the brake pistons 107 will bring the trailer brakes back to the initial position thereof, as well as force hydraulic fluid back through branch lines 108, 109 and tube 92, thence to the master brake cylinder M. In the event that a sudden surge of the trailer, for instance, or other factor produces a pressure within master brake cylinder M which might tend to rupture or destroy any of the brake lines or parts associated therewith, the relief valve 60 in master cylinder M will open and relieve excess pressure, although the brakes can still be applied. In addition, if the electrical system for energizing solenoid 88 should be inoperative, continued movement of the trailer relative to the towing vehicle, either forwardly or rearwardly, will produce a sufficient pressure of hydraulic fluid, insufficient to unseat relief valve 60, but still sufficient to unseat relief valve 94, in order to apply the trailer brakes. In this connection, it will be noted that relief valve 94 should be set so that the trailer brakes will not be applied when the trailer is being pulled up a steep hill by the towing vehicle. Since the pressure to be applied by the master cylinder may vary between different types of brakes, the setting of relief valves 60 and 94 will depend upon the type of installation involved, although those skilled in the art will be readily capable of appropriate adjustments.

Although a preferred embodiment of this invention has been illustrated and described, it will be understood that other embodiments may exist and that various changes may be made, all without departing from the spirit and scope of this invention.

I claim:

1. A hydraulic brake actuator for a wheeled trailer connected to a towing vehicle, said towing vehicle being provided with brakes and said trailer being provided with hydraulic brakes, comprising:

a hitch means connecting said trailer with said towing vehicle;

a master brake cylinder mounted on said trailer for producing hydraulic fluid pressure, said master cylinder including a piston movable in one direction in a cylindrical space to produce said hydraulic fluid pressure and said piston being movable by engagement with a plunger;

means for transmitting said hydraulic fluid pressure to said trailer brakes; and means associated with said hitch for causing said master brake cylinder to produce hydraulic fluid pressure upon relative movement between said towing vehicle and said trailer in either direction while said hitch remains connected to said vehicle, said means being constructed and arranged to move said plunger toward said master cylinder when relative movement between said towing vehicle and said trailer takes place in one direction and to move said master cylinder toward said plunger when said relative movement takes place in the opposite direction.

2. A hydraulic brake actuator as defined in claim 1, wherein said means associated with said hitch means includes resilient means opposing movement of said plunger toward said master cylinder and also opposing movement of said master cylinder toward said plunger.

3. A hydraulic brake actuator as defined in claim 1, including lever means for manually moving said plunger toward said master cylinder.

4. A hydraulic brake actuator as defined in claim 3, including:
   chain means connectable between said lever means and said towing vehicle for moving said lever means to move said plunger in the event of failure or disconnection of said hitch means; and
   ratchet means for maintaining said lever means in a position to which said lever means is moved.

5. A hydraulic brake actuator as defined in claim 1, including:
   a shaft formed as a part of said hitch means, one end of said shaft being connected to said towing vehicle and said shaft having a rearwardly facing shoulder;
   bearing means for said shaft mounted on a frame of said trailer;
   front plate means normally abutting the rear of said bearing means and engageable by said shaft shoulder;
   rear plate means to which said master cylinder is affixed so as to be movable therewith, said rear plate means being connected to the opposite end of said shaft;
   guide means for movement of said master cylinder generally parallel to said shaft and constructed and arranged to restrict rearward movement of said master cylinder beyond a predetermined point;
   resilient means urging said front plate means and said rear plate means apart; and
   said plunger means being movable rearwardly by said front plate means and said master cylinder being movable forwardly by said rear plate means.

6. A hydraulic brake actuator for a wheeled trailer connected to a towing vehicle, said towing vehicle being provided with brakes and said trailer being provided with hydraulic brakes, comprising:
   a hitch means connecting said trailer with said towing vehicle;
   a master brake cylinder mounted on said trailer for producing hydraulic fluid pressure;
   means associated with said hitch for causing said master brake cylinder to produce hydraulic fluid pressure upon relative movement between said towing vehicle and said trailer in either direction while said hitch remains connected to said vehicle;
   means for transmitting said hydraulic fluid pressure to said trailer brakes;
   means for controlling the transmission of said hydraulic fluid pressure to said trailer brakes responsive to the application of the brakes of said towing vehicle;
   means connectable with said towing vehicle for independently causing said master brake cylinder to produce hydraulic fluid pressure upon breakage or disconnection with said hitch means, whereby said trailer becomes detached from said towing vehicle; and
   means associated with said transmitting means and responsive to a predetermined pressure, in excess of that normally produced in applying said trailer brakes, for permitting transmission of said hydraulic fluid pressure from said master cylinder to said trailer brakes when said pressure exceeds said predetermined pressure, said pressure responsive means being independent of said controlling means responsive to the application of said towing vehicle brakes.

7. In a hydraulic brake actuator as defined in claim 6 including:
   a housing having an inlet passage connected with said master brake cylinder and an outlet passage connected with said trailer brakes;
   means for controlling the transmission of said hydraulic fluid pressure to said trailer brakes responsive to the application of the brakes of said towing vehicle, said towing vehicle being provided with a stop light controlled through an electrical circuit and said controlling means including a plunger movable by an electrical solenoid connectable to the stop light circuit, whereby hydraulic fluid pressure is transmitted to said trailer brakes through said controlling means only when said towing vehicle brakes are applied;
   said controlling means including a valve normally covering a port between said inlet passage and said outlet passage and said valve being movably mounted on a stem connected to said solenoid plunger, so that said valve will normally be held against said port by pressure in said inlet passage but will be forced off said port when the pressure in said outlet passage exceeds the pressure in said inlet passage; and
   said means responsive to a predetermined pressure includes a relief valve controlling flow between said inlet passage and said outlet passage through a separate port in said housing and resilient means urging said relief valve toward a seat.